(12) United States Patent
Zhang et al.

(10) Patent No.: US 6,847,503 B2
(45) Date of Patent: Jan. 25, 2005

(54) REPEATABLE RUNOUT COMPENSATION IN A DISC DRIVE

(75) Inventors: Tao Zhang, Shakopee, MN (US); John Christopher Morris, Minneapolis, MN (US); Thomas C. Zirps, Minnepolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 263 days.

(21) Appl. No.: 10/277,768

(22) Filed: Oct. 22, 2002

(65) Prior Publication Data

US 2003/0184909 A1 Oct. 2, 2003

Related U.S. Application Data

(63) Continuation-in-part of application No. 10/177,551, filed on Jun. 21, 2002, now abandoned.
(60) Provisional application No. 60/377,759, filed on May 3, 2002, and provisional application No. 60/369,082, filed on Apr. 1, 2002.

(51) Int. Cl.[7] .............................................. G11B 5/596
(52) U.S. Cl. ............................... 360/77.04; 360/77.01; 360/78.09
(58) Field of Search ............................... 360/75, 77.01, 360/77.02, 77.04, 78.09, 77.08, 78.04, 48; 700/32, 44–45, 54–55, 78

(56) References Cited

U.S. PATENT DOCUMENTS

| | | | | |
|---|---|---|---|---|
| 5,365,458 A | * | 11/1994 | Tamura et al. ............... | 700/279 |
| 5,978,169 A | * | 11/1999 | Woods ..................... | 360/77.04 |
| 6,069,764 A | | 5/2000 | Morris et al. | |
| 6,115,203 A | | 9/2000 | Ho et al. | |
| 6,310,742 B1 | | 10/2001 | Nazarian et al. | |
| 6,437,936 B1 | * | 8/2002 | Chen et al. ............... | 360/77.04 |
| 6,563,663 B1 | * | 5/2003 | Bi et al. ................... | 360/77.04 |
| 6,684,114 B1 | * | 1/2004 | Erickson et al. .............. | 700/45 |
| 2001/0036033 A1 | | 11/2001 | Baumann et al. | |
| 2001/0038507 A1 | | 11/2001 | Szita | |
| 2001/0048570 A1 | | 12/2001 | AbouJaode et al. | |
| 2002/0039248 A1 | | 4/2002 | Liu et al. | |
| 2003/0058569 A1 | * | 3/2003 | Hsin ....................... | 360/77.04 |

OTHER PUBLICATIONS

Robert A. Meyers, Editor, "Control Systems Feedback," Encyclopedia of Physical Science and Technology, 2nd ed., Academic Press, Inc. (San Diego, CA, US), p. 457–461, ( Jun. 20, 1992).

Robert A. Meyers, Editor, "Navigation, Inertial," Encyclopedia of Physical Science and Technology, 2nd ed., Academic Press, Inc. (San Diego, CA, US), p. 620–624, ( Jun. 20, 1992).

* cited by examiner

*Primary Examiner*—Sinh Tran
*Assistant Examiner*—Jason Olson
(74) *Attorney, Agent, or Firm*—David K. Lucente; Derek J. Berger

(57) ABSTRACT

A system and method for correcting repeatable runout errors during manufacture of a disc drive. The system includes a Kalman filter having a recursive learning gain input and includes a recursive learning Again-setting circuit coupled to the recursive learning gain input. The recursive learning gain is initially set based on an estimate of a ratio of non-repeatable run out error to an estimate of the repeatable run out error. On subsequent recursions, the recursive learning gain-setting is reduced.

30 Claims, 11 Drawing Sheets

REPEATABLE RUNOUT COMPENSATION IN A DISC DRIVE

CROSS-REFERENCE TO RELATED APPLICATION

This application is a Continuation-In-Part of U.S. patent application Ser. No. 10/177,551 filed Jun. 21, 2002, abandoned and claims priority benefits from U.S. Provisional Application No. 60/377,759 filed May 3, 2002 and from U.S. Provisional Application No. 60/369,082 filed Apr. 1, 2002.

FIELD OF THE INVENTION

The present invention relates generally to manufacture of disc drives. In particular, the present invention relates to a method and apparatus for compensation for repeatable run out errors in disc drives.

BACKGROUND OF THE INVENTION

Embedded servo fields are recorded on disc surfaces and are used by a servo controller in accurately aligning a read/write head over a desired track. There are imperfections in the processes of positioning the embedded servo fields on a disc surface and, in general, the position of each embedded servo field has a repeatable runout error. During disc drive manufacture, the positions of the embedded servo fields is measured. A correction or compensation table is then calculated. The compensation table is stored in the disc drive.

During subsequent normal operation of the disc drive by the user, the correction or compensation table is used by the servo control loop to improve the alignment of the head over a selected data track.

Due to the presence of noise of various kinds, there are imperfections in the process of measuring the positions of the embedded servo fields. Multiple iterations of each measurement are needed to overcome the noise problems and accurately calculate a compensation table. The measurement process becomes increasingly time consuming as the number of tracks on a disc increases in newer disc drive designs. The time consumed in making multiple iterations of measurements is a barrier to economical, rapid mass production of disc drives.

A method and apparatus are needed to reduce the number of iterations of measurements and reduce the time needed to measure repeatable run out errors and calculate a compensation table.

SUMMARY OF THE INVENTION

Disclosed are apparatus and methods for correcting repeatable runout errors in a disc drive. The system operates with the disc drive to calculate and store correction data for repeatable runout error by completing processes during manufacture of the disc drive.

A disc is provided with data tracks that include embedded servo fields. Each embedded servo field has a servo field position on the disc that deviates from a zero acceleration path by a repeatable run out error. The disc drive also includes a servo controller that is coupled to an actuator to position a head on the zero acceleration path for a selected data track. The head accesses the selected data track and provides a head position output including the repeatable run out error and non repeatable error.

The system updates the correction data as a function of the head position output. The system includes a Kalman filter having a recursive learning gain input and includes a recursive learning gain-setting circuit coupled to the recursive learning gain input.

On an initial recursion, the recursive learning gain-setting circuit sets the recursive learning gain setting to an initial learning gain based on estimates of non-repeatable run out error and repeatable run out error. On subsequent recursions, the recursive learning gain-setting circuit sets the recursive learning gain setting to a subsequent learning gain that is less than the initial learning gain. The Kalman filter recursively provides converging values of the correction data. The disc drive stores a final converged value of the correction data after a final recursion.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below, An Optimal Recursive Zero Acceleration Path (OR-ZAP) algorithm is provided for repeatable runout (RRO) compensation based on a stochastic estimation technique. By utilizing statistical information of non-repeatable runout (NRRO) for the type of drive being manufactured, the algorithm provides an optimal estimate of the written-in RRO error by minimizing the mean square error of the estimated ZAP profile through optimally choosing the learning gain for a Kalman filter used in the ZAP process.

Figure 1:
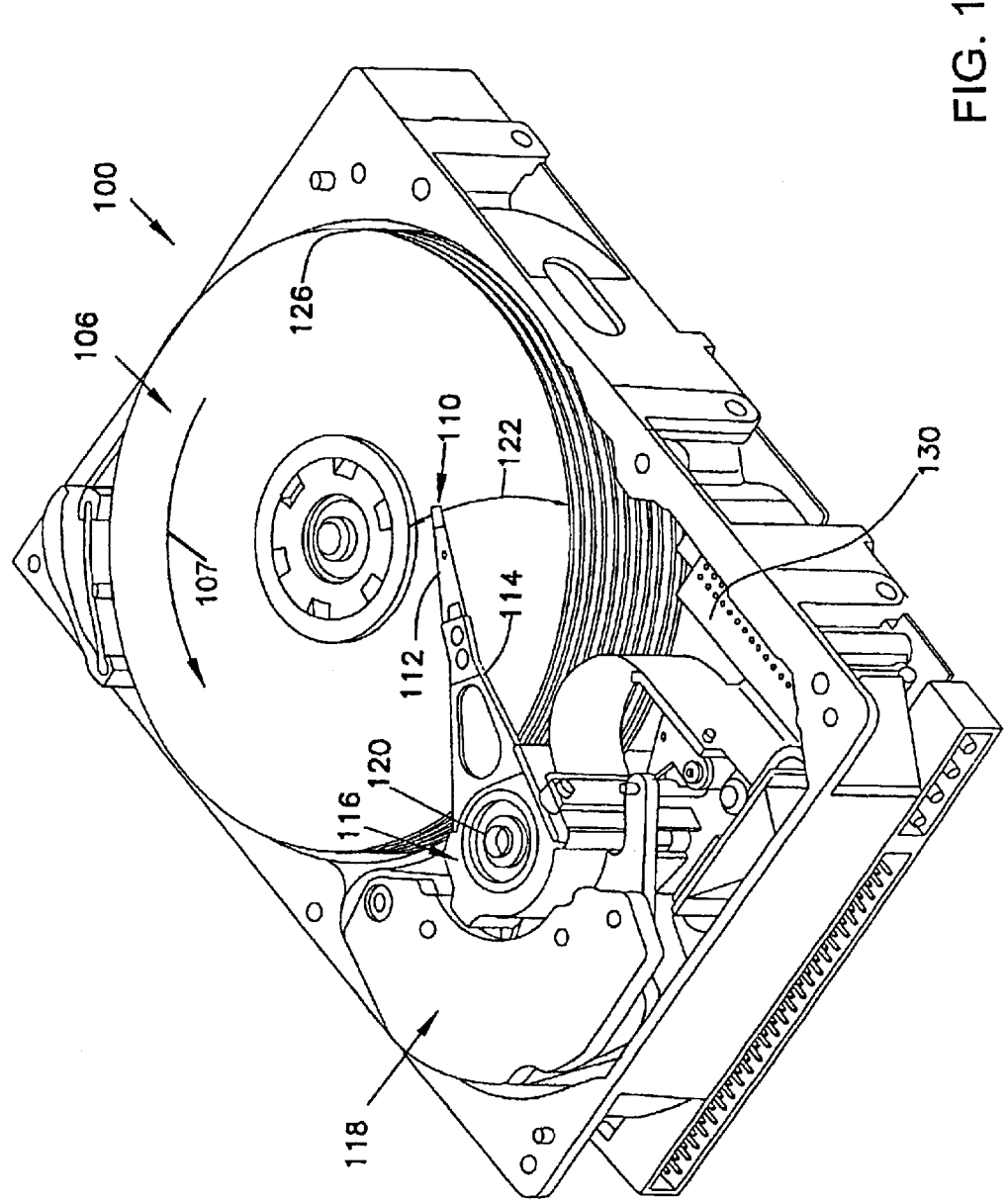
FIG. 1 illustrates a top isometric view of a disc drive that includes a stored ZAP table that is generated using a Kalman filter.

FIG. 1 illustrates an embodiment of a disc drive 100 including a slider or head 110 that includes one or more read/write transducers. Disc drive 100 includes a disc pack 126 having storage media surfaces (disc surfaces) 106 that are typically layers of magnetic material. The disc pack 126 includes a stack of multiple discs. A head suspension assembly 112 includes the slider 110 with a read/write transducer for each stacked disc. Disc pack 126 is spun or rotated as shown by arrow 107 to allow head suspension assembly 112 to access different rotational locations for data on the storage surfaces 106 on the disc pack 126.

The head suspension assembly 112 is actuated to move radially, relative to the disc pack 126, as shown by arrow 122 to access different radial locations for data on the disc surfaces 106 of disc pack 126. Typically, the actuation of the head suspension assembly 112 is provided by a voice coil motor 118. Voice coil motor 118 includes a rotor 116 that pivots on axle 120 and an arm or beam 114 that actuates the head suspension assembly 112. The head suspension assembly 112 presses down on a central gimbal point on the slider 110, providing a load force that holds the slider 110 in close proximity to the storage surface 106. One or more read/write transducers are deposited on the slider 110 and fly above the disc surface 106 at a fly height. A circuit at location 130 provides an electric current to the voice coil motor 118 to control the radial position of the slider 110 and electrically interfaces read/write transducers on slider 110 with a computing environment. The circuit 130 includes a controller and a correction table. The correction table corrects the operation of the controller to compensate for written-in, repeatable runout errors in positions of embedded servo fields on the storage surfaces 106, as explained in more detail below in connection with an example illustrated in FIG. 2.

Figure 2:
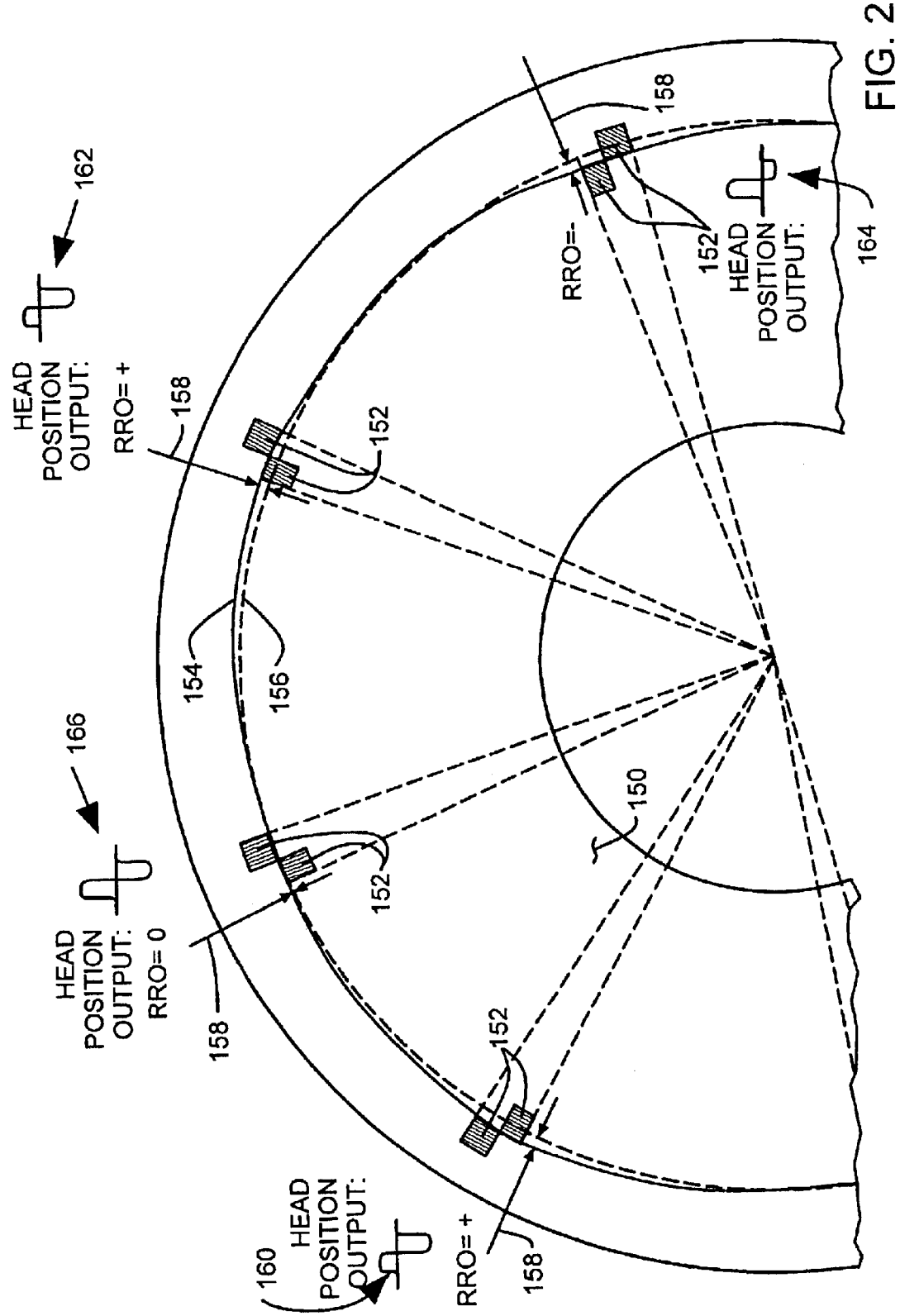
FIG. 2 schematically illustrates repeatable run out errors in the positions of embedded servo fields.

FIG. 2 schematically illustrates a disc surface 150 that has embedded servo fields 152 recorded on it. The embedded servo fields 152 define a generally circular data track 154 illustrated as a solid line. Disc surface 150 typically comprises approximately 30,000 generally concentric data tracks such as data track 154. In general, the data track 154 deviates from a circular path 156 defined by a fixed, non-accelerating position of a head over the data track. This circular path 156 is illustrated as a dashed line and is also referred to as a zero acceleration path (ZAP) 156. Each embedded servo field 152 is radially displaced from the zero acceleration path 152 by a repeatable run out error 158.

The embedded servo fields 152 are recorded on the disc surface 150 during manufacture of the disc drive, and are used by a servo controller in normal disc drive operation for accurately aligning a read/write head over a desired data track 154. There are imperfections in the processes of positioning the embedded servo fields on a disc surface and, in general, the position of each embedded servo field has a repeatable runout error 158 that can be positive, negative or zero as illustrated in FIG.2.

During disc drive manufacture, the position of each embedded servo field 152 is measured relative to the zero acceleration path 156. If there is a positive repeatable runout error, then the head provides a head position output 160, 162 that includes a first pulse that is smaller than a second pulse. If there is a negative repeatable runout error, then the head position output 164 includes a first pulse that is greater than a second pulse. If there is a zero repeatable runout error, then the head position output 166 includes a first pulse that is the same amplitude as a second pulse. The amplitude of the various pulses is a function of how closely aligned the read head is with a particular servo field 152 as the head passes over the servo field 152. A correction or compensation table is then calculated based on the measured repeatable runout errors 158. The compensation table is stored in the disc drive during manufacture.

During subsequent normal operation of the disc drive by the user, the correction or ZAP compensation table is used by the servo control loop to improve the alignment, also called tracking, of the head over a selected data track. During normal operation, the head is controlled to track the desired data track 154 using the ZAP compensation table.

Due to the presence of noise of various kinds during the manufacturing process, there are imperfections in the process of measuring the positions of the embedded servo fields 152. Multiple iterations of each measurement are needed to overcome the noise problems and accurately calculate a compensation table. The measurement process becomes increasingly time consuming as the number of tracks on a disc increases in newer disc drive designs. The time consumed in making multiple iterations of measurements is a barrier to economical, rapid mass production of disc drives.

The present invention is described below in connection with FIGS. 3–9 that reduces the number of iterations of measurements and reduce the time needed to measure repeatable run out errors and calculate a ZAP compensation table.

Figure 3:
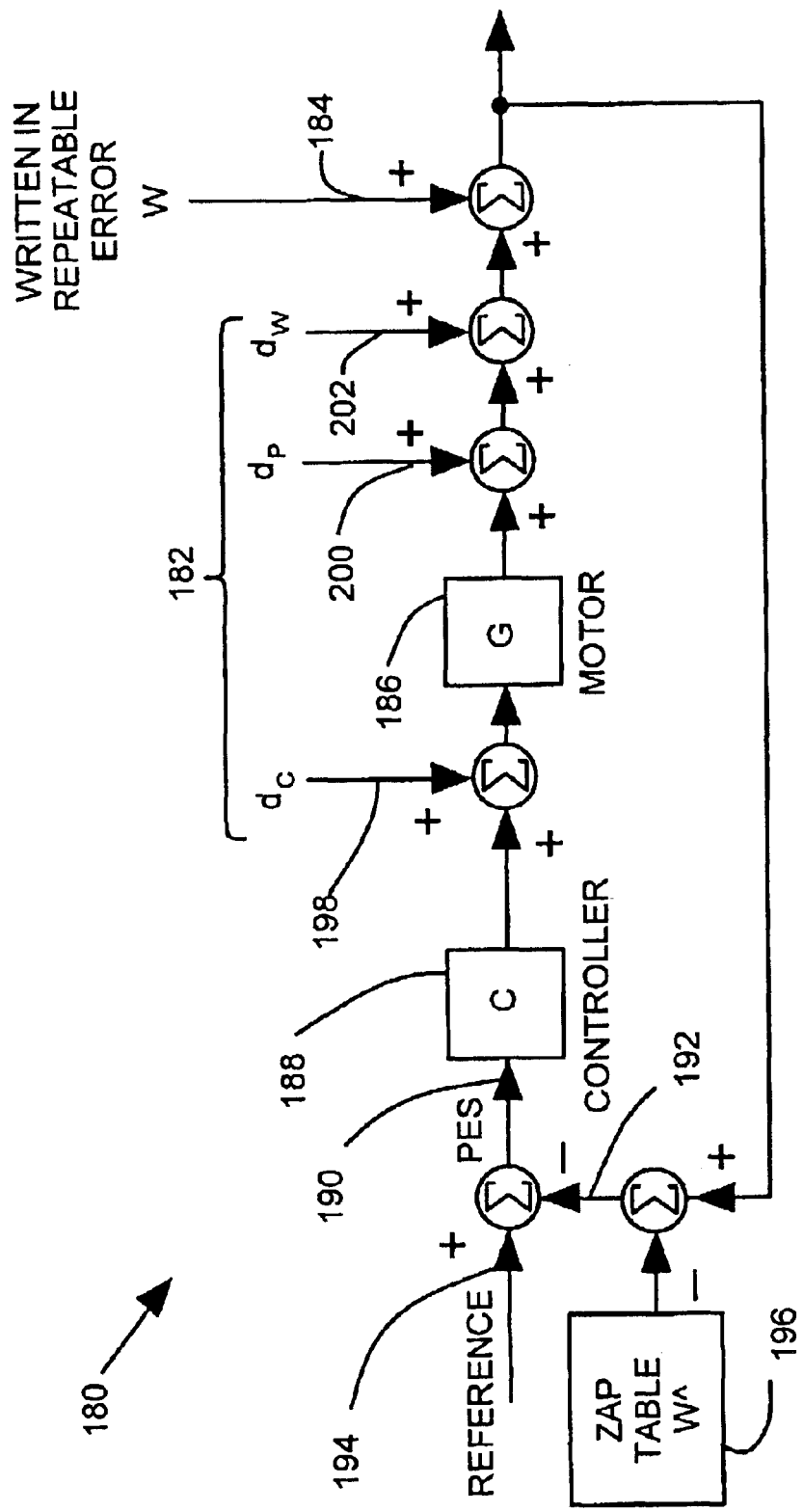
FIG. 3 schematically illustrates a head positioning servo loop and noise inputs.

FIG. 3 schematically illustrates a head positioning servo loop 180 and noise inputs 182 that are present during the manufacturing process when written-in repeatable runout error W at 184 is being measured. Zero Acceleration Path (ZAP) compensation schemes that handle Written-in Repeatable Runout (WI-RRO) are known for various types of disc drive types. Currently the main concern is the excessive amount of time needed during manufacture to make the large number of measurements W needed in order to calculate the ZAP table $W^\wedge$ at 196. Because a large number of tracks need to be processed in high capacity drives, reducing ZAP time is important for disk drive mass production. In the present arrangement, the number of iterations needed to achieve a satisfactory ZAP compensation table is reduced or optimized. In the present arrangement, a manufacturing process uses a Kalman filter to minimize or reduce the ZAP processing time needed to achieve a satisfactory repeatable runout (RRO) reduction, for example, a 3-sigma 4% of track pitch RRO target.

Generally, efforts to reduce ZAP processing time have included using a computationally simplified ZAP algorithm, reducing the model identification work, developing more efficient ZAP algorithms to minimize the number of revolutions of PES data used in a ZAP process, or a combination of these methods. There have been many efforts to simplify ZAP calculation and reduce the burden of the model identification work. The present arrangement better utilizes the statistical information of nonrepeatable runout (NRRO) to maximize the efficiency of a ZAP process.

The present arrangement suitably uses all the available information of the system, such as statistical descriptions of the process noises, knowledge of the process dynamics and the information about the initial conditions of the variables of interest. In the present arrangement, a recursive ZAP algorithm uses a Kalman filtering technique which was originally used in the optimal state estimation of stochastic processes.

To illustrate the design principle of the proposed ZAP method, a disk drive servo loop with a ZAP correction is shown in FIG. 3 where G and C denote transfer functions of a voice coil motor (VCM) 186 and a servo controller 188, respectively. A position error signal (PES) 190 is the error between a corrected head position output 192 and a reference signal 194. The reference signal 194 indicates a desired centered position of a head on the selected track. W at 184 represents the written-in error of the positions of servo fields. The table $W^\wedge$ at 196 denotes the ZAP correction table for the written-in error W. A noise $d_C$ at 198 represents nonrepeatable torque disturbances such as windage, rotational vibration, resonance mode effect, etc. A noise $d_P$ at 200 denotes the head non-repeatable disturbances, including measurement noises, disk flutter, eccentricity, etc.. A noise $d_W$ at 202 denotes repeatable disturbances located at harmonic frequencies due to disk motion or motor vibrations.

ZAP performance depends on how accurately the written-in value W^ at 196 is estimated. From a state estimation viewpoint, the written-in disturbance W at 184 can be considered as an unmeasured state of a dynamical system. Therefore, the ZAP profile identification is approached as a state estimation problem for a statistical process. The Kalman filter is one of the best solutions for the stochastic estimation. The Kalman Filter is a well-known algorithm developed by R. E. Kalman in 1960. It is a recursive technique of obtaining the solution to a least squares fit. Given only the mean and standard deviation of noises, the Kalman filter is the best linear estimator. The Kalman filter considers a stochastic process governed by the linear stochastic difference Equations 1A–1B:

$$x(n)=Ax(n-1)+Bu(n)+q(n-1) \quad \text{Equation 1A}$$

$$z(n)=Dx(n)+r(n) \quad \text{Equation 1B}$$

where $x(n)$ is the system state; $z(n)$ is the system measurement; $u(n)$ is the input of the process; A, B, D represent the process dynamic model; the random variables q and r represent the process and measurement noise, respectively. For simplicity, r and q are assumed to be zero mean white noises with covariance $$E(rr^T)=R, E(qq^T)=Q. \quad \text{Equation 2}$$

where Q denotes the covariance of process noise and R denotes the covariance of the measurement noise. The Kalman estimation problem is one of designing an observer to estimate the state $x(n)$ using the noise corrupted measurement data $z(n)$. The Kalman filter is a recursive state estimator in the following form $$K(n) = \frac{[AP(n-1)A^T + Q]D^T}{D[AP(n-1)A^T + Q]D^T + R} \quad \text{Equation 3}$$

$$P(n)=[1-K(n)D][AP(n-1)A^T+Q] \quad \text{Equation 4}$$

$$z^{\char`\^}(n)=D[Ax^{\char`\^}(n-1)+Bu(n)] \quad \text{Equation 5}$$

$$x^{\char`\^}(n)=Ax^{\char`\^}(n-1)+Bu(n)+K(n)[z(n)-z^{\char`\^}(n)] \quad \text{Equation 6}$$

where x^(n) is the estimate of the system state x(n); K(n) is the estimator gain; P(n) is called the state estimation error covariance; z^(n) is called the pre-predicted output. The Kalman filter Equations 3–6 yield an optimal estimate of the state x(n), optimal in the sense that the spread of the estimate-error probability density is minimized, i.e., the estimate x^(n) given by the Kalman filter minimizes the cost function $J(x^{\char`\^})=E[(x^{\char`\^}(n)-x(n))^T (x^{\char`\^}(n)-x(n))]$.

Figure 4:
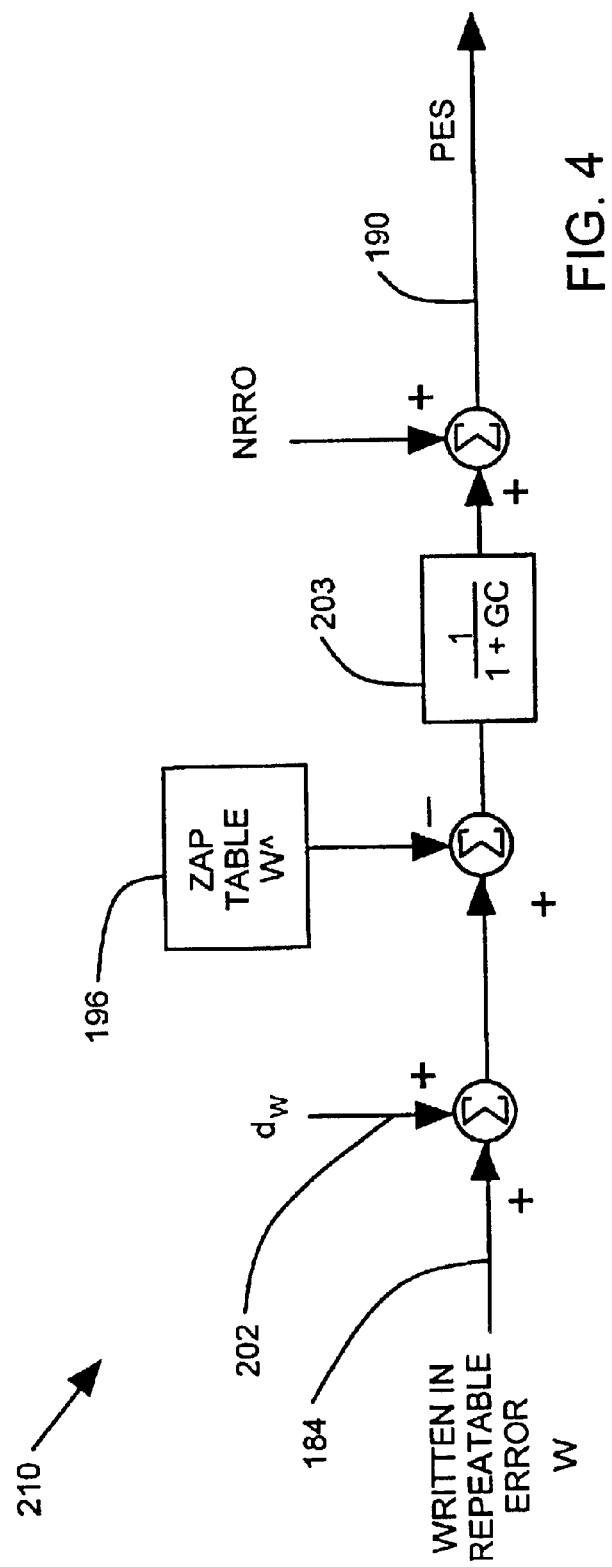
FIG. 4 schematically illustrates a head positioning servo loop that is substantially equivalent to the head positioning servo loop illustrated in FIG. 3.

FIG. 4 schematically illustrates a head positioning servo loop 210 that is substantially equivalent to the head positioning servo loop 180 illustrated in FIG. 3. A combined transfer function 1/(1+GC) at 203 in FIG. 4 represents the transfer functions of both the controller 188 and the motor 186 as they are connected in FIG. 3.

By considering the written-in disturbance W at 184 as an input of the servo loop shown in FIG. 3, we may reexpress the written-in error, ZAP correction, NRRO and PES in FIG. 4 where the non-repeatable runout (NRRO):

$$NRRO = \frac{d_C G}{1+GC} + \frac{d_P}{1+GC} \quad \text{Equation 7}$$

The process shown in FIG. 4 can be described by a linear stochastic model:

$$W(n)=W(n-1)+d_W(n) \quad \text{Equation 8A}$$

$$z(n)=W(n)+(1+GC)NRRO(n) \quad \text{Equation 8B}$$

where W(n) is the system state, and the system output $$z(n)=(1+GC)PES(n)+W^{\char`\^}(n-1) \quad \text{Equation 8C}$$

Comparing Equation 8 with Equation 1, we see that by choosing:

$$A=1, B=0, D=1, x^{\char`\^}(n)=W^{\char`\^}(n) \quad \text{Equation 9A}$$

$$q(n)=d_W(n), r(n)=(1+GC)NRRO(n) \quad \text{Equation 9B}$$

that Equation 8 can be viewed as a special class of stochastic process described in Equation 1. As explained below in an example shown in FIGS. 5–6, a Kalman filter can be used to speed up the iterative process of calculating the ZAP correction table W^ at 196 in FIGS. 4–5.

Figure 5:
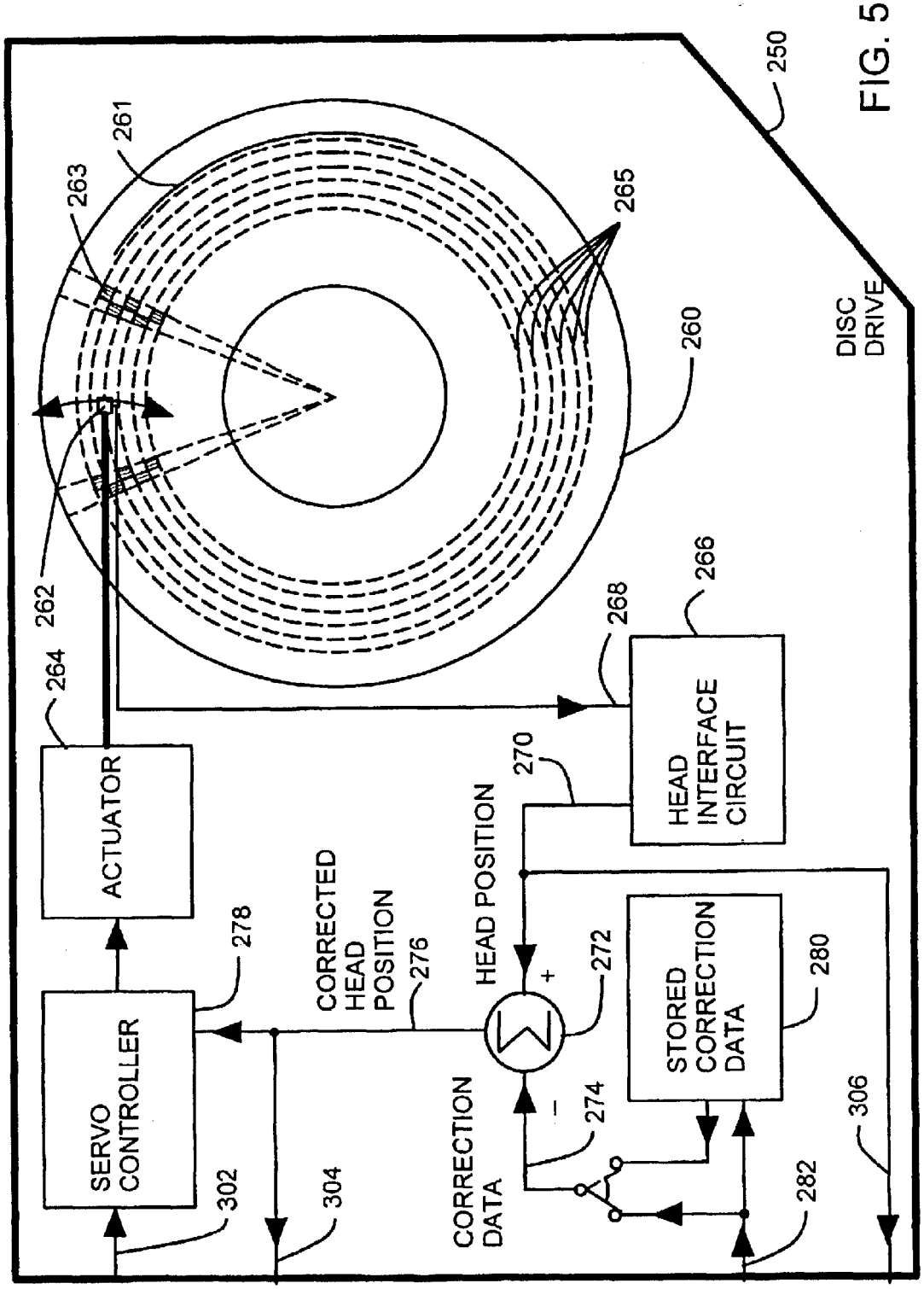
FIGS. 5 and 6 are right and left sides, respectively, of an illustration of a disc drive connected to a manufacturing system that includes a Kalman filter.
Figure 6:
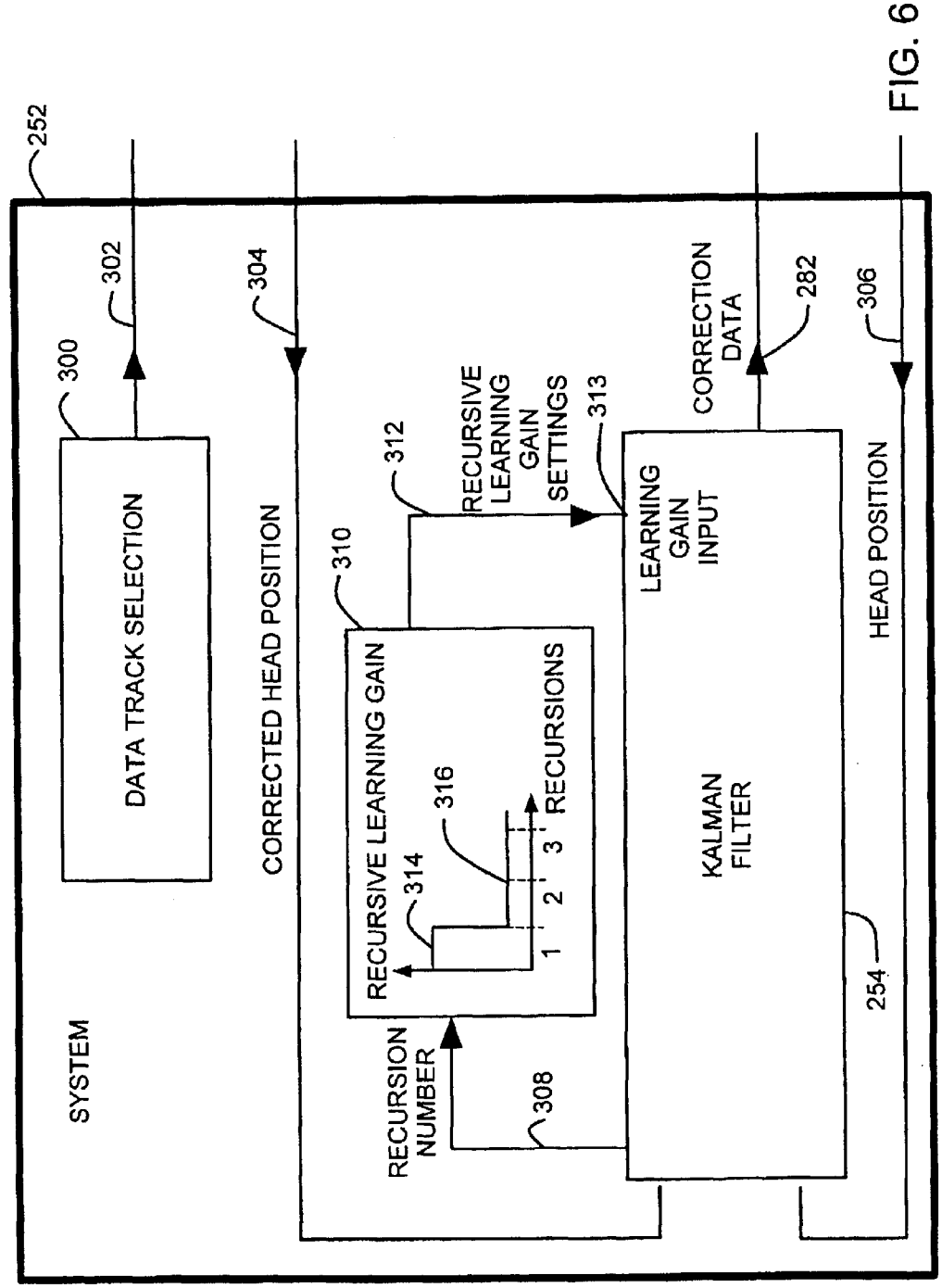

FIGS. 5 and 6 are right and left sides, respectively, of an illustration of a disc drive 250 connected to a manufacturing system 252 that includes a Kalman filter 254. The disc drive includes a disc 260, a read/write head 262 accessing the disc 260 and an actuator 264 positioning the read/write head 262 on the disc 260. A head interface circuit 266 receives electrical signals on line 268 from the read/write head 262 and provides a head position output on line 270. In a summing node 272, the head position output 270 is subtracted from correction data at 274. The summing node 270 provides a corrected head position output at 276. The corrected head position output at 276 is coupled to a servo controller 278. The servo controller 278 controls the position of the actuator 264 as a function of the corrected head position. During normal operation, the correction data 274 is received from stored correction data 280 in the disc drive. During the manufacturing operation that takes place when written-in runout is measured and correction data is calculated, the correction data 274 is received from the manufacturing system 252 on line 282.

The manufacturing system 252 includes a data track selection circuit 300 that provides a data track selection output 302 to the servo controller 278. The data track selection output 302 indicates a particular track to the servo controller 278 that is to be accessed. The corrected head position 276 is fed back on line 304 to the manufacturing system 252. The head position 270, which is uncorrected, is fed back on line 306 to the manufacturing system 252. The Kalman filter 254 receives the corrected head position on line 304 and also receives the uncorrected head position on line 306. The Kalman filter 254 is preferably a discrete filter than generates a recursion number on line 308. A recursive learning gain setting circuit 310 receives the recursion number 308. The recursive learning gain setting circuit 310 provides a recursive learning gain setting at 312 to a learning gain input 313 of the Kalman filter 254. The Kalman filter 254 recursively provides correction data at 282 to the disc drive 250. The Kalman filter 254 and the recursive learning gain-setting circuit are preferably implemented or realized as a microprocessor system (or a custom integrated circuit) executing a discrete Kalman filtering algorithm. The operation of the Kalman filter is explained in more detail below in connection with examples in Equations 10–22.

By substituting Equation 9 into Equations 3–6, a Kalman filter type of ZAP estimation algorithm is:

ZAP Learning Gain:

$$K(n) = \frac{P(n-1)+Q}{P(n-1)+Q+R} \qquad \text{Equation 10}$$

Estimation Error Variance:

$$P(n)=[1-K(n)][P(n-1)+Q] \qquad \text{Equation 11}$$

ZAP Profile Updating:

$$W\hat{\,}(n)=W\hat{\,}(n-1)+K(n)[(1+GC)PES(n)] \qquad \text{Equation 12}$$

where PES(n) is the n-th revolution of PES. Q denotes the variance of the repeatable disturbances due to disk motion or motor vibrations. It follows from Equation 7 and Equation 9 that $r(n)=d_C G+d_P$. Hence, R is the variance of the sum of the non-repeatable torque disturbances and head disturbances. It is shown from Equation 10 that if the NRRO variance R is large, the ZAP learning gain K(n) becomes small. This implies that when more NRRO noises are corrupted in the PES, less confidence is had in the RRO information provided by PES. The estimator will place a small weight K(n) on the measured PES data. It can be proven that the choice of the learning rate Equation 10 is optimal for each iteration because it minimizes the mean square cost function $J(n)=E[(W\hat{\,}(n)-W)^T(W\hat{\,}(n)-W)]$.

Several ZAP non-optimized approaches use a structure similar to:

$$ZAP(n)=ZAP(n-1)+K[(1+GC)RRO(n)] \qquad \text{Equation 13}$$

where ZAP(n) is the estimated written-in RRO profile updated at the n-th iteration, K is a learning gain, RRO(n) is the average of the PES collected at the n-th iteration. The number of PES revolutions for collecting RRO(n), and the learning factor K are parameters in a ZAP process. The following lists the different selections of these non-optimized ZAP schemes S1–S5:

S1.-ZAP 10 revs PES for RRO collection per iteration. The first iteration K(1)=1, and the second and third iterations K(2)=K(3)=0.5.

S2. Bi-ZAP-10 revs PES per iteration, K is a constant selected through experiment, K=0.5.

S3SP-ZAP-3 revs PES per iteration, the first and second iteration learning factors K(1) and K(2) are changed though adjusting the gain of controller C.

S4 Scheme S1—ZAP with Real-time ZAP—on-line updating the ZAP table with a constant K chosen between 0 to 1. K=0.1.

S5-Zap. 1 rev PES per iteration with the time varying learning factor K(n)=1/n.

The ZAP learning algorithm Equation 13 shows that the current ZAP table ZAP(n) equals to the sum of previous ZAP table ZAP(n-1) and a correction term K(1+GC)RRO(n). As the iteration number increases, ZAP(n-1) closes to true written-in ZAP profile. In this case, NRRO components dominate the measured PES. To avoid the effect of the NRRO, it is necessary to reduce the learning rate. Hence, the choice of the learning factor K should depend on how much RRO information contained in the new measurements. A constant learning gain K for all ZAP iterations is not an optimal choice.

Scheme S5-ZAP uses a time varying gain to adjust the ZAP learning process. By comparing Equation 14 and Equations 10–12, it is shown that the Scheme S5-ZAP is a special form of Equation 12 with estimator gain K(n)=1/n. This learning factor can be analyzed from the statistic viewpoint to evaluate whether it is a reasonable choice. To simplify the analysis, it is assumed that Q=0. Substituting Equation 10 into Equation 11 leads to:

$$P(n-1) = \left[1 - \frac{P(n-2)}{P(n-2)+R}\right]P(n-2) = \frac{RP(n-2)}{P(n-2)+R} \qquad \text{Equation 14}$$

By Equation 10, we have $$K(n) = \frac{1}{1+\frac{R}{P(n-1)}} \qquad \text{Equation 15}$$

Substituting Equation 14 into Equation 15 suggests that:

$$K(n) = \frac{1}{2+\frac{R}{P(n-2)}}. \qquad \text{Equation 16}$$

By repeating the above step, we further have:

$$K(n) = \frac{1}{n+\frac{R}{P(0)}} \qquad \text{Equation 17}$$

Therefore, Scheme S5-ZAP is a special case of Equations 10–12 with the choice of the parameters satisfying $R/P(0) \to 0$. $R/P(0) \to 0$ implies either $R \to 0$ or $P(0) \to \infty$. $R \to 0$ means that the measurement noise variance is close to zero. Obviously, this assumption is incorrect because of the existence of NRRO. For $P(0) \to \infty$, it is shown from Equations 10–12 that the learning factor of the first iteration $K(1) \to 1$, and therefore $W\hat{\,}(1) \to (1+GC)PES(1)$. This implies that for the first step of ZAP estimate, all the measured PES is considered as written-in RRO information. In disk drives, typically about 40–60% of PES components are NRRO. Hence choosing the initial condition $P(0) \to \infty$ is not adequate.

An advantage of the new ZAP algorithm is that the learning gain K(n) in Equations 10–12 is optimally chosen based on the statistic information of NRRO. In disk drives, the NRRO distribution is measurable and consistent over different tracks, heads (even different drives). When such information is utilized in the present OR-ZAP arrangement, a better ZAP performance is obtained.

There are two parameters Q and R, and two initial conditions x^(0) and P(0) in the present OR-ZAP algorithm Equations 10–12. It is shown from Equations 7 and 9 that the non-repeatable measurement noise is:

$$r(n)=d_P+d_C G \qquad \text{Equation 18}$$

Since TPI may change for different types of drives, the level of the measurement noises also changes. To unify the noise variance R, the non-repeatable noise r(n) is normalized by the repeatable disturbances as $$N_r = \frac{d_P+d_C G}{d_W+W} = \frac{(1+PC)NRRO}{(1+PC)RRO} = \frac{NRRO}{RRO} \qquad \text{Equation 19}$$

The following lists an example of steps to calculate the measurement noise variance parameter R.

(i) Select several tracks in ID, and collect RRO and NRRO (ii) Calculate $\sigma_{RRO}$ and $\sigma_{RRO}$ of RRO and NRRO, respectively (iii) Calculate the NRRO-to-RRO Ratio (NRR), NRR= $\sigma_{NRRO}/\sigma_{RRO}$
(iv) The measurement noise variance R in the ID zone can be calculated by $$R_{ID} = \left[\frac{1}{m}\sum_{i=1}^{m} NRR_i\right] \quad \text{Equation 20}$$

with m being the number of the tested tracks.
(v) Select other tracks at MD and OD, repeat the above (i)–(iv) to get different noise variance $R_{MD}$, and $R_{OD}$ at MD and OD zones.

Depending on the NRRO consistency of a drive, one may adjust variance R parameter for different drives, heads or zones during the ZAP process. For example, if the NRRO in a drive is very similar from ID to OD and heads to heads, one time calibration is enough for one drive. If NRRO changes very large from zone to zone, it may be necessary to calibrate R based on different zones to improve the overall ZAP performance. The variance parameter Q can be chosen based on the understanding of the amplitude and frequency locations of repeatable disturbances. A typical value of Q is between 0 and 0.01.

It is found that some coherence RRO exists on adjacent tracks in disk drives. The initial ZAP profile W^(0) may be set as the ZAP table learned from the adjacent tracks. If no ZAP profile of the previous track is available, W^(0) can be simply set as zero. The initial estimation error variance P(0) should be chosen based on the NRRO-to-RRO ratio and W^(0). In general, if we have more confidence on W^(0), a small P(0) can be selected. Otherwise, a large P(0) should be used. When W^(0)=0, a reasonable choice is P(0)=1.

Non-optimized ZAP schemes use various methods to calculate (1+GC)PES(n). For example, frequency domain method uses FFT/IFFT scheme, and time domain method uses convolution and the filter fitting of (1+GC). In order to minimize the time used in the ZAP profile calculation and model identification, the present OR-ZAP method uses the simple double integrator model as the VCM model. The following formula is applied to do the calculation:

$$(1+GC)PES(n)=PES(n)+G^{\wedge}u_C(n) \quad \text{Equation 21}$$

with $u_C(n)=C*PES(n)$ being the controller output, and G^ is chosen as $$G^{\wedge} = \frac{K_G}{S^2} \quad \text{Equation 22}$$

Since the constant gain $K_G$ is usually available after servo loop calibration, there is no additional model identification work required. Although the double integrator model results in some model mismatch in high frequency range, it does not affect overall ZAP performance very much. The reason is that the new recursive ZAP algorithm iterates in every revolution. It has more chances to correct the ZAP profile error caused by the inaccurate model.

It should be noticed that the repeatable disturbance $d_W$ is caused by the spindle motor movement, which is mainly located in the low frequency range. Since $d_W$ is not a written-in error, preferably ZAP does not correct it. In fact, typical servo controller usually contains an adaptive-feedforward algorithm to handle the first and second harmonic frequency RRO. To remove the components of the first several harmonic frequency from the ZAP profile, a Zero Phase Filter (ZPF) is used to filter the estimated ZAP profile W^before putting it into the servo loop.

Using the procedure (i)–(v) presented above on one type of drive, the NRRO-to-RRO ratios of several tracks are measured. It is shown that the NRRO from ID to OD is NRR=0.8–1.2. To test the sensitivity of the algorithm with respective to ZAP parameters, we set R=1 and Q=0 for all ID to OD tracks of all heads. The initial conditions are W^(0)=0 and P(0)=1. Since parameters Q and R are constants, the learning rate K(n) can be precalculated.

Figure 7:
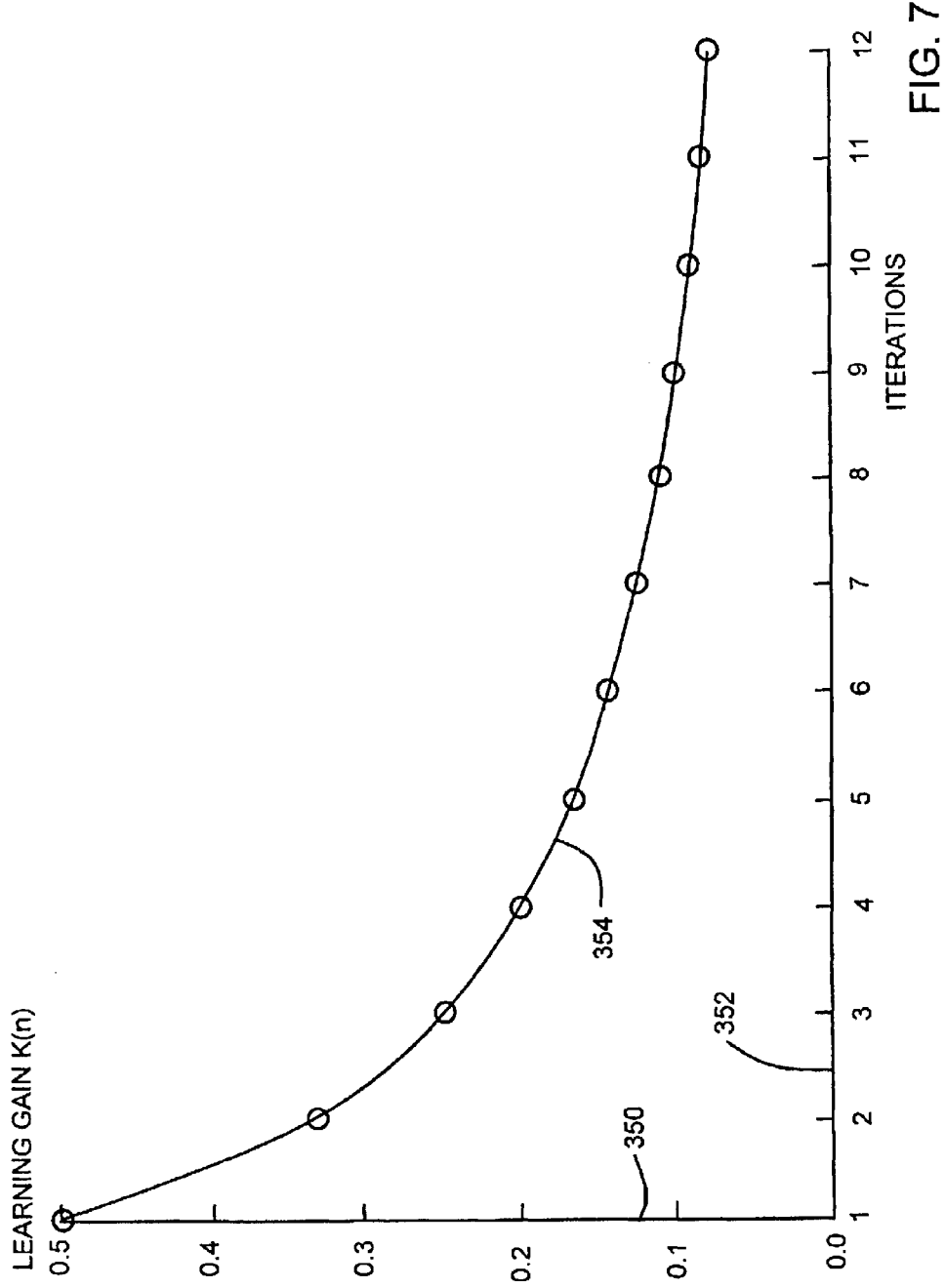
FIG. 7 schematically illustrates ZAP learning gain K(n) at successive iterations n.

FIG. 7 schematically illustrates ZAP learning gain K(n) at successive iterations n. In FIG. 7, a vertical axis 350 represents learning gain K(n) and a horizontal axis 352 represents a number of iterations or recursions. FIG. 7 shows the ZAP learning gain K(n) used at each iteration along line 354.

A linear stochastic model such as Equation 8 is used to explore the ZAP Process for ZAP algorithm development. An optimal recursive ZAP shown in Equations 10–12 is used. An optimal ZAP learning gain based on the statistic information of NRRO is used. The process of calculating the ZAP parameters (i.e., repeatable noise variance and non-repeatable noise variance) is also used. A method used in determining the initial condition is based on the statistic process information.

The present arrangement shown in FIGS. 5–6 provides a system 252 for calculating correction data at 282 for repeatable run out errors of embedded servo positions on a disc in a disc drive. The system 252 includes a recursive learning gain-setting circuit 310 that provides, on an initial recursion 1, an initial learning gain setting 314 that is based on an estimate of a ratio of non-repeatable run out error to repeatable run out error; and that provides, on subsequent recursions 2, 3 etc., a subsequent learning gain setting 316, or settings, that are less than the initial learning gain setting 314.

The system 252 also includes a Kalman filter 254 that has a learning gain input 313 for receiving the learning gain settings 314, 316. The Kalman filter 254 recursively provides converging values of the correction data on line 282.

A first input line 306 is coupled to the Kalman filter and is couplable to a head position output 270 from the disc drive 250 that is being tested and calibrated. A second input line 304 is coupled to the Kalman filter and is couplable to a corrected head position output 276 from the disc drive 250. An output line 282 receives the correction data from the Kalman filter 254 and is couplable to the disc drive 250. The correction data includes a final converged value of the correction data, after a final recursion, for storage in the disc drive 250 as stored correction data 280.

The system 252 operates with the disc drive 250 to calculate and store correction data 274 for repeatable runout error by completing a number of processes A through D as follows:

A. Providing a disc 260 with data tracks 261 that include embedded servo fields 263, with each embedded servo field 263 having a servo field position on the disc 260 that deviates from a zero acceleration path 265 by a repeatable run out error.

B. Coupling a servo controller 278 to an actuator 264 to position a head 262 on the zero acceleration path 265 for a selected data track 261.

C. accessing the selected data track 261 with the head 262 and providing a head position output 270 including the repeatable run out error and non repeatable error.

D. updating the correction data 274 as a function of the head position output 270 by steps D1 through D3.

D1. Providing a system 252 including a Kalman filter 254 having a recursive learning gain input 313 and including a recursive learning gain-setting circuit 310 coupled to the recursive learning gain input 313.

D2. setting the recursive learning gain setting 312, on an initial recursion 1, to an initial learning gain 314 based on an estimate of a ratio of non-repeatable run out error to an estimate of the repeatable run out error; and setting the recursive learning gain setting 312, on subsequent recursions 2, 3, . . . to a subsequent learning gain 316 that is less than the initial learning gain 314, the Kalman filter 254 recursively providing converging values of the correction data 274.

D3. storing a final converged value of the correction data in the disc drive after a final recursion.

Figure 8:
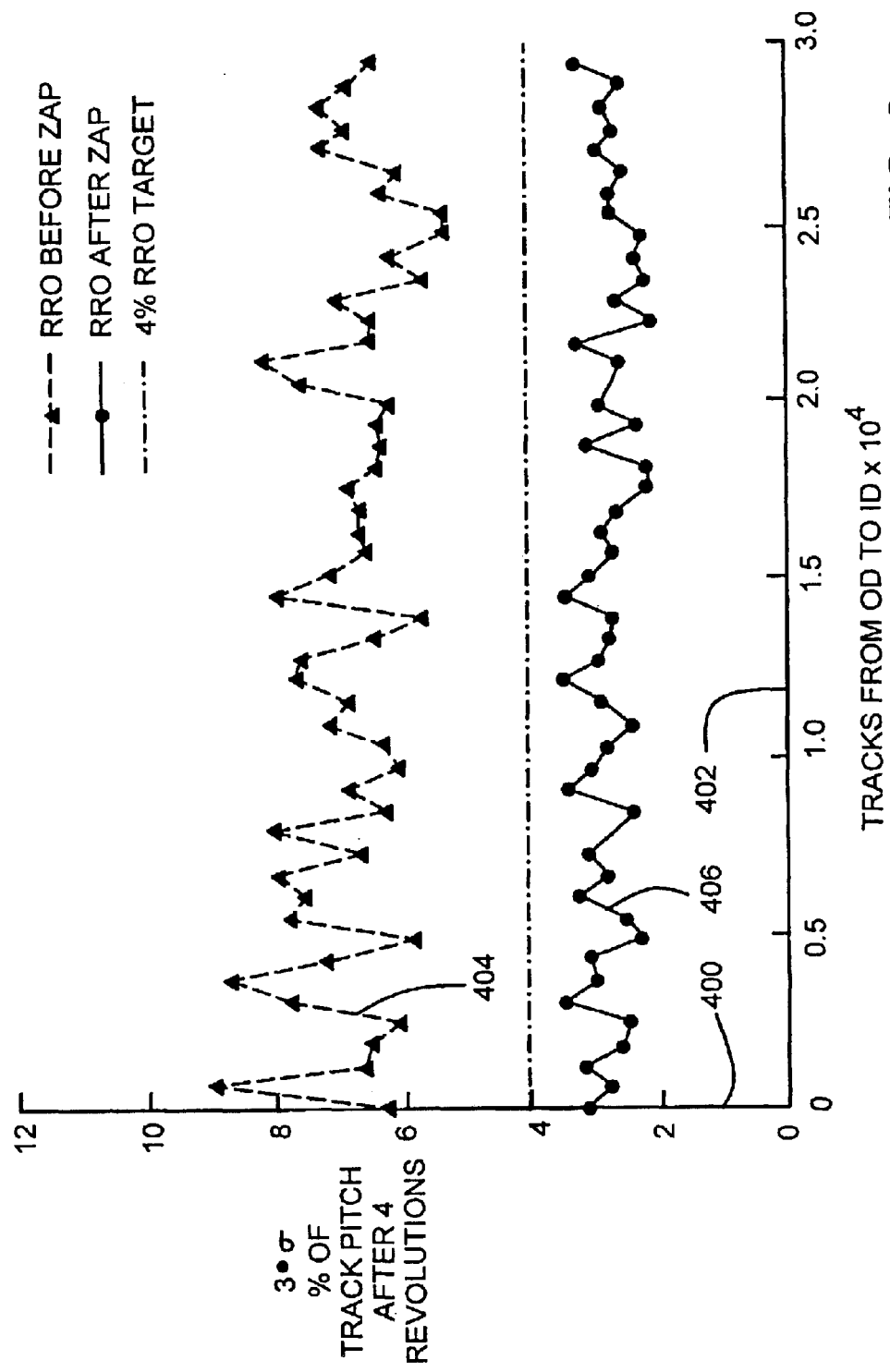
FIG. 8 schematically illustrates remaining uncorrected repeatable run out error after 4 iterations.
Figure 9:
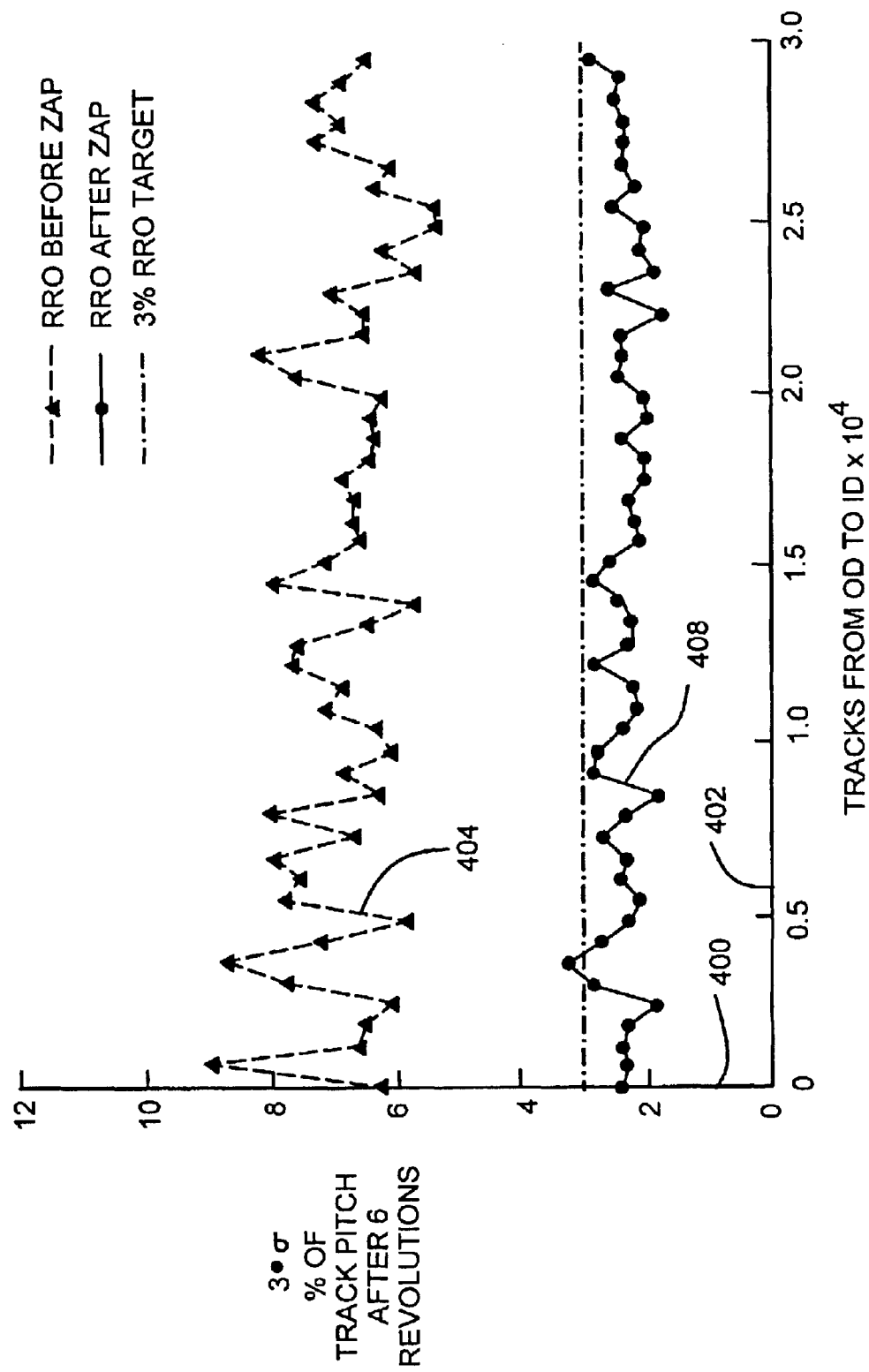
FIG. 9 schematically illustrates remaining uncorrected repeatable run out error after 6 iterations.

FIGS. 8, 9 schematically illustrates remaining uncorrected repeatable run out error after 4 disc revolutions and 6 disk revolutions respectively. In each of FIGS. 8, 9, a vertical axis 400 represents a 3 sigma value of repeatable runout error and a horizontal axis 402 represents a track number ranging from zero at an inside diameter (ID) of a disc to approximately 30,000 at an outside diameter (ID) of the disc. FIG. 8 plots testing results before any correction (dashed line 404) and after 4 iterations (e.g., 4 recursions of the Kalman filter 254) represented as solid line 406. The average RRO improvement over the approximately 30,000 tracks on the disc is 59%. The 3-sigma value of RRO can be reduced to 4% of track pitch or less with only 4 recursions. FIG. 9 shows the experimental results with 6 recursions. The average RRO improvement is 64% with 6 recursions and a 3% of track pitch RRO target is achieved as illustrated at 408.

Figure 10:
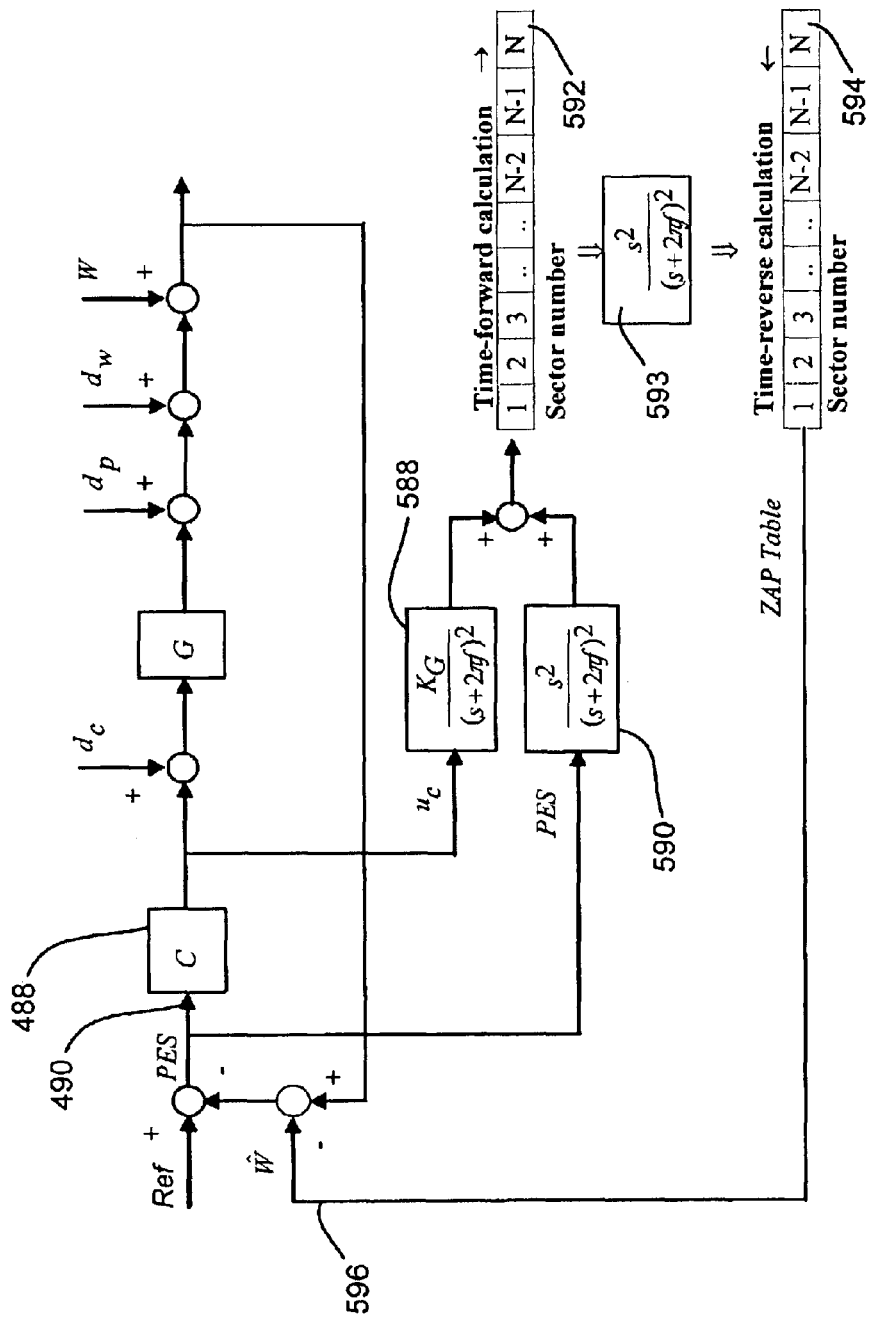
FIG. 10 schematically illustrates a head positioning servo loop implementing a computational algorithm that is generally efficient enough to implement in real time.

FIG. 10 schematically illustrates a head positioning servo loop implementing a computational algorithm that is generally efficient enough to implement in real time. Referring again to Equation 21, certain problems may arise when computing $^G u_c^{(n)}$. When the controller output $u_c^{(n)}$ is integrated twice, the resulted signal might be drifting and/or contain a large bias due to a non-zero mean of the signal $u_c^{(n)}$. These problems might necessitate a post-treatment (batch) process, which is a great loss of efficiency relative to an on-line ZAP scheme. In a preferred embodiment, an on-line ZAP scheme is implemented with a Zero Phase Filter (ZPF) of the following form:

$$\vec{F}_{ZPF} = \frac{s^2}{(s + 2\pi f)^2} \quad \text{Equation 23}$$

where f is the cutoff frequency of the ZPF. The cutoff frequency f can be adjusted based on the required attenuation and frequency range of eliminating the low-frequency components in the ZAP profile. With a ZPF like that of Equation 23, the ZAP calculation of Equation 12 is modified to become $$\hat{W}(n) = \hat{W}(n-1) + K(n)\left[PES(n)\frac{s^2}{(s+2\pi f)^2} + u_c(n)\frac{K_G}{s^2}\frac{s^2}{(s+2\pi f)^2}\right]\vec{F}_{ZPF}$$

$$= \hat{W}(n-1) + K(n)\left[PES(n)\frac{s^2}{(s+2\pi f)^2} + u_c(n)\frac{K_G}{(s+2\pi f)^2}\right]\vec{F}_{ZPF}$$

Equation 24 shows that the double-integrator VCM model is cancelled by the zeros of ZPF. The double-integration that could cause signal bias and/ or drifting is eliminated.

With this reduced order VCM model and this choice of ZPF, FIG. 10 illustrates a Kalman filter of the present invention implemented with only three 2nd-order filters.

Therefore, the ZAP algorithm illustrated in FIG. 10 greatly reduces the computational burden of the Kalman filter used in the ZAP process.

Referring to FIG. 10, there is shown a circuit like that of FIG. 3, but modified to permit very efficient updates of the ZAP table. PES signal 490 and output from controller 488 pass through second-order filters 590 and 588 as shown, respectively. The results are summed to become the time-forward calculation 592, implemented as a temporary RAM whose length is equal to the servo sector number N. This process is also called time-forward calculation, which means at servo sector k, the kth RAM value is updated. Then the sum value in the temporary RAM is filtered (i.e. by ZPF 593) in a time-reverse fashion, i.e., at servo sector k, the (N-k)th ZAP table value is updated based on Equation 24. The resultant time-reverse calculation 594 results in a ZAP profile 596 that is updated during the servo interrupt, without the necessity of extra disc revolutions during the calculation (i.e. updated on-the-fly).

Figure 11:
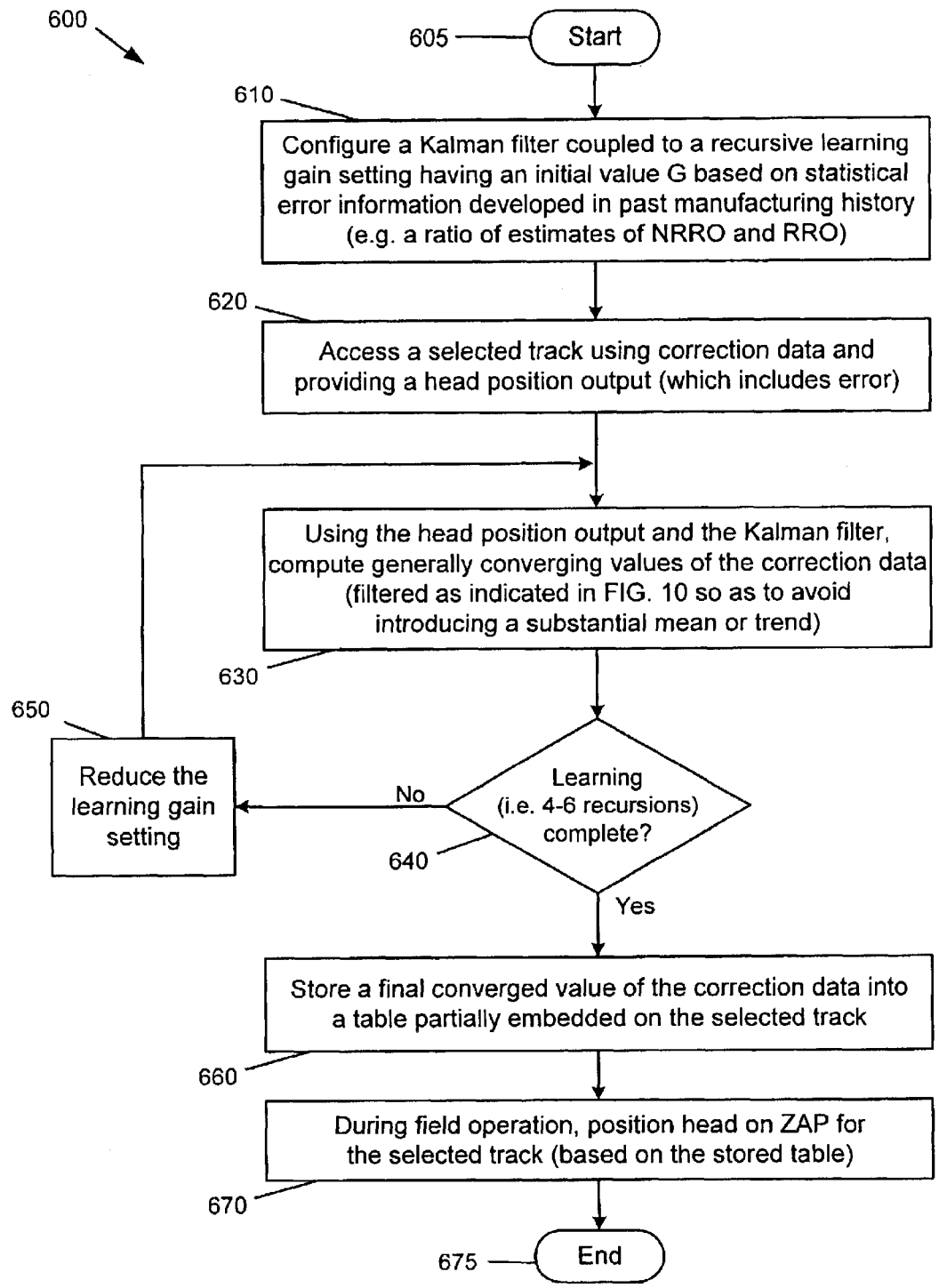
FIG. 11 shows a method of the present invention in flowchart form.

FIG. 11 shows explicitly a method of the present invention 600 comprising steps 605 through 675. A Kalman filter is coupled to a recursive learning gain setting having an initial value G 610. A selected track is accessed (using correction data), providing a head position output 620. This output includes non-repeatable runout and repeatable runout. Converging values of the correction data are computed 630 using a Kalman filter configured as shown in FIG. 10 (to avoid generating a substantial non-zero mean or trend). It is then determined whether the learning is complete 640. One of ordinary skill will recognized several methods for determining this, such as by a recursion count reaching a threshold or an estimated RRO becoming sufficiently small. If the learning is not complete, the learning gain is reduced 650. Otherwise, a (generally) converged correction value is recorded in a servo field of the selected track 660, which is subsequently used for track following in field operation 670.

In summary, a system (such as 252) corrects repeatable runout errors in a disc drive (such as 250). The system (such as 252) operates with the disc drive (such as 250) to calculate and store correction data (such as 274) for repeatable runout error by completing a number of processes during manufacture of the disc drive.

A disc (such as 260) is provided with data tracks (such as 261) that include embedded servo fields (such as 263). Each embedded servo field (such as 263) has a servo field position on the disc (such as 260) that deviates from a zero acceleration path (such as 265) by a repeatable run out error. The disc drive (such as 250) includes a servo controller (such as 278) that is coupled to an actuator (such as 264) to position a head (such as 262) on the zero acceleration path (such as 265) for a selected data track (such as 261). The head (such as 262) accesses the selected data track (such as 261) and provides a head position output (such as 270) including the repeatable run out error and non repeatable error.

The system (such as 252) updates the correction data (such as 274) as a function of the head position output (such as 270). The system (such as 252) includes a Kalman filter (such as 254) having a recursive learning gain input (such as 313) and also includes a recursive learning gain-setting circuit (such as 310) coupled to the recursive learning gain input (such as 313).

On an initial recursion, the recursive learning gain-setting circuit (such as 310) sets the recursive learning gain setting (such as 312) to an initial learning gain (such as 314) based on an estimate of a ratio of non-repeatable run out error to an estimate of the repeatable run out error. On subsequent recursions, the recursive learning gain-setting circuit (such as 310) sets the recursive learning gain setting to a subsequent learning gain (such as 316) that is less than the initial learning gain. The Kalman filter (such as 254) recursively provides converging values of the correction data (such as 274). The disc drive (such as 250) stores a final converged value (such as 280) of the correction data after a final recursion.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular disc drive application while maintaining substantially the same functionality without departing from the scope and spirit of the present invention. For example, the correction data stored in the disc drive may be stored either in an electronic memory such as EEPROM or stored on the disc itself and loaded into RAM upon startup of the disc drive. In addition, although the preferred embodiment described herein is described in connection with an example of a magnetic disc, it will be appreciated by those skilled in the art that the arrangements disclosed can be used on heads of different design including optical and magnetoopic heads. The teachings of the present invention can be applied to a variety of different types of disc drives, without departing from the scope and spirit of the present invention.

What is claimed is:

1. A method of updating correction data for repeatable runout error on a disc in a disc drive, comprising steps of:
   A. coupling a recursive learning gain setting to a Kalman filter;
   B. setting the recursive learning gain setting, on an initial recursion, to an initial learning gain setting based on a ratio of estimates of non-repeatable runout error and repeatable run out error; and setting the recursive learning gain setting, on subsequent recursions, to a subsequent learning gain setting that is less than the initial learning gain setting, the Kalman filter recursively providing converging values of the correction data; and
   C. storing a final converged value of the correction data after a final recursion.

2. The method of claim 1, further comprising:
   D. providing the disc with data tracks that include embedded servo fields, each embedded servo field having a servo field position on the disc that deviates from a zero acceleration path by the repeatable run out error;
   E. coupling a servo controller to an actuator to position a head on the zero acceleration path for a selected data track;
   F. accessing the selected data track with the head and providing a head position output including the repeatable run out error and non repeatable error; and
   G. updating the correction data with the Kalman filter as a function of the head position output.

3. The method of claim 1 further comprising:
   providing a linear stochastic model of a servo control system comprising the servo controller and the actuator in the Kalman filter.

4. The method of claim 3 further comprising:
   basing the linear stochastic model on a model of the form:

$$x(n)=Ax(n-1)+Bu(n)+q(n-1)$$

$$z(n)=Dx(n)+r(n)$$

where $x(n)$ is the system state; $z(n)$ is the system measurement; $u(n)$ is the input of the process; A, B, D represent the process dynamic model; the random variables q and r represent the process and measurement noise, respectively.

5. The method of claim 1 further comprising:
   basing the estimates of repeatable runout error and non repeatable runout error on statistical information developed in past manufacturing history.

6. The method of claim 1 further comprising:
   storing the final converged value of the correction data on the disc in the disc drive.

7. The method of claim 1 further comprising:
   storing the final converged value of the correction data in an electronic memory in the disc drive.

8. The method of claim 1 further comprising:
   coupling a recursion number between the Kalman filter and the recursive learning gain-setting circuit.

9. The method of claim 1 further comprising:
   providing a data track selection circuit that is couplable to a servo controller in the disc drive.

10. The method of claim 1 further comprising:
    obtaining the final converged value of correction data in no more that 4 recursions.

11. The method of claim 1 further comprising:
    obtaining the final converged value of correction data in no more than 6 recursions.

12. The method of claim 1 in which the setting step (B) includes a step of updating an element of the correction data using at least one filter having a form of $(s/(s+2\times pi\times f))$ squared, where s is a frequency-domain time-derivative operator and f is a cutoff frequency.

13. The method of claim 1 in which the setting step (B) includes a step of updating a given element of the correction data based on both a time-forward filter and a time-reverse filter.

14. The method of claim 1 in which the setting step (B) includes a step of updating an element of the correction data by a double-integration process that does not introduce a substantial non-zero trend into the correction data.

15. A system for calculating correction data for repeatable run out errors of embedded servo positions on a disc in a disc drive, the system comprising:
    a recursive learning gain-setting circuit that provides, on an initial recursion, an initial learning gain setting that is based on a ratio of estimates of non-repeatable run out error and repeatable run out error; and that provides, on subsequent recursions, a subsequent learning gain setting that is less than the initial learning gain;
    a Kalman filter having a learning gain input for receiving the learning gain settings, the Kalman filter recursively providing converging values of the correction data;
    a first input line coupled to the Kalman filter and couplable to a head position output from the disc drive;

a second input line coupled to the Kalman filter and couplable to a corrected head position output from the disc drive; and an output line receiving the correction data from the Kalman filter and couplable to the disc drive, the correction data including a final converged value of the correction data, after a final recursion, for storage in the disc drive.

16. The system of claim 15 wherein the recursive learning gain-setting circuit and the Kalman filter are implemented as a microprocessor system, the microprocessor system executing a discrete Kalman filtering algorithm.

17. The system of claim 15 wherein the Kalman filter includes a linear stochastic model of a servo control system comprising a servo controller and an actuator controlling a position of a head on the disc.

18. The system of claim 15 wherein the linear stochastic model is based on a model of the form:

$$x(n)=Ax(n-1)+Bu(n)+q(n-1)$$

$$z(n)=Dx(n)+r(n)$$

where $x(n)$ is the system state; $z(n)$ is the system measurement; $u(n)$ is the input of the process; A, B, D represent the process dynamic model; the random variables q and r represent the process and measurement noise, respectively r and q are zero mean white noises with covariance $E(rr^T)=R$, $E(qq^T)=Q$ with constants R and Q.

19. The system of claim 15 wherein the estimates of repeatable runout error and non repeatable runout error are based on statistical information developed during past manufacturing history of disc drives.

20. The system of claim 15 wherein the correction data is stored on a disc in the disc drive.

21. The system of claim 15 wherein the correction data is stored in an electronic memory in the disc drive.

22. The system of claim 15 wherein a recursion number is coupled between the Kalman filter and the recursive learning gain-setting circuit.

23. The system of claim 15 further comprising a data track selection circuit that is couplable to a servo controller in the disc drive.

24. The system of claim 15 wherein the final converged value of correction data is obtained in no more that 4 recursions.

25. The system of claim 15 wherein the final converged value of the correction data is obtained in no more than 6 recursions.

26. The system of claim 15 in which the Kalman filter includes a second-order filter having a form of $(s/(s+2\times pi\times f))$ squared, where s is a frequency-domain time-derivative operator and f is a cutoff frequency.

27. The system of claim 15 in which the Kalman filter includes a signal path containing both a time-forward filter and a time-reverse filter both for updating a given element of the correction data.

28. A method for calculating correction data for repeatable run out errors of embedded servo positions on a disc in a disc drive, the method comprising steps of:

executing a Kalman filter algorithm having a learning gain input for receiving learning gain settings, the Kalman filter recursively providing converging values of the correction data;

coupling a head position output along a first input line from the disc drive to the Kalman filter;

coupling a corrected head position output along a second line from the disc drive to the Kalman filter;

coupling the correction data from the Kalman filter along an output line to the disc drive, the correction data including a final converged value of the correction data, after a final recursion, for storage in the disc drive; and providing at least one learning gain setting(s) to the Kalman filter each based on a ratio of estimates of non-repeatable run out error and repeatable run out error.

29. The method of claim 28 in which the step of executing the Kalman filter algorithm includes a step of updating an element of the correction data using at least one filter having a form of $(s/(s+2\pi \times f))$ squared, where s is a frequency-domain time-derivative operator and f is a cutoff frequency.

30. The method of claim 28 in the step of executing the Kalman filter algorithm includes a step of updating a given element of the correction data based on both a time-forward filter and a time-reverse filter.

* * * * *